Aug. 17, 1937.  J. EATON  2,090,526
CIRCUIT CONTROLLING DEVICE
Filed April 3, 1936
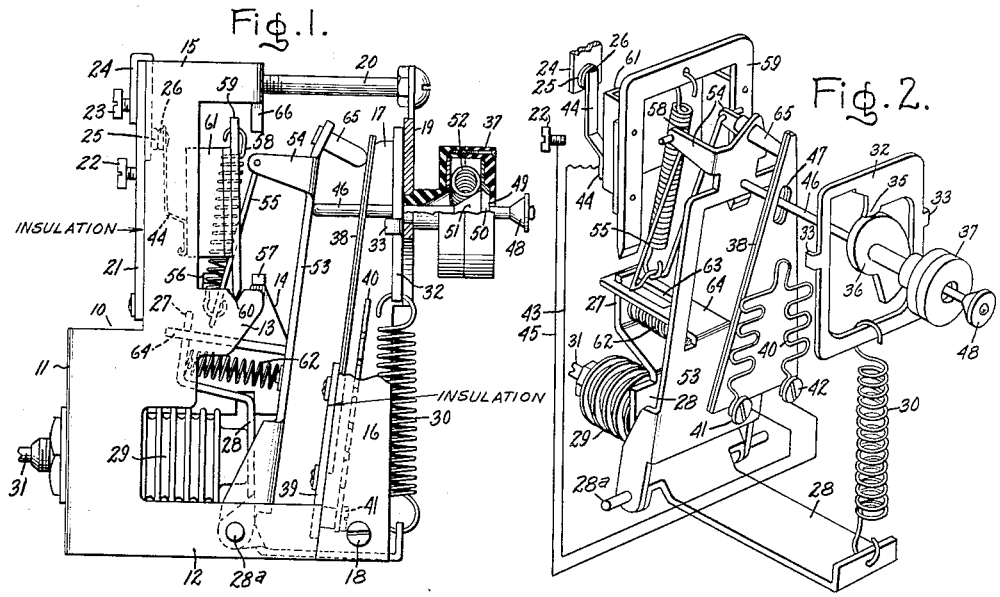
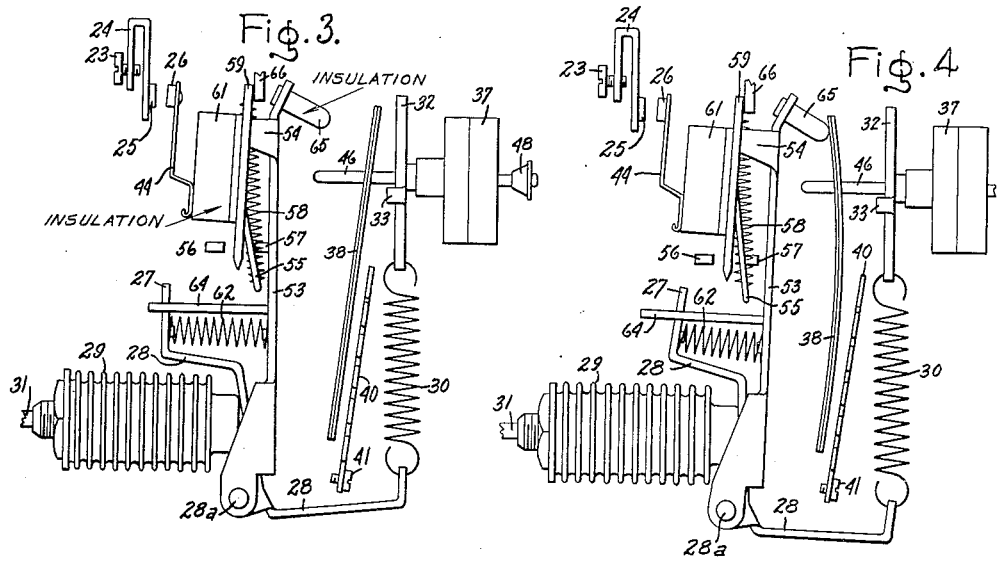
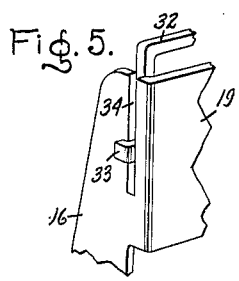
Inventor:
John Eaton,
by Harry E. Dunham
His Attorney.

Patented Aug. 17, 1937

2,090,526

UNITED STATES PATENT OFFICE 2,090,526

CIRCUIT CONTROLLING DEVICE

John Eaton, Schenectady, N. Y., assignor to General Electric Company, a corporation of New York Application April 3, 1936, Serial No. 72,553

8 Claims. (Cl. 200—81)

My invention relates to circuit controlling devices, more particularly to circuit controlling devices for providing combined automatic and manual control of electrical apparatus such, for example, as electric refrigerators, and has for an object the provision of a simple, reliable and inexpensive device of this character.

Circuit controlling devices of the above character have heretofore been provided for controlling electrical apparatus such as electric refrigerators, and a typical combined automatic and manual control device of this character such, for example, as is shown in United States Patent No.1,921,126 issued August 8, 1933, to Leonard P. Hutt, includes temperature responsive means for operating the circuit controlling contacts between open and closed circuit positions at predetermined minimum and maximum temperatures to maintain a desired mean average temperature, overload responsive means for opening the contacts upon the occurrence of predetermined current conditions, and manual means for resetting the overload means and for opening and closing the contacts at will.

While circuit controlling devices of the type disclosed in this Hutt patent are entirely suitable for accomplishing combined automatic and manual control, something is yet to be desired in a control device of this character which is compact in its construction and which is arranged to carry out additional control functions.

In so far as I am aware, all previously known control devices of this type required a manual operation in order to reclose the circuit controlling contacts after an overload operation to the open circuit position. Such devices are ordinarily applied to household refrigerators, and the necessity for this manual resetting operation may often cause considerable inconvenience. For example, if a temporary overload condition effects operation of the control device to its open circuit position, and the tripped condition of the device is not noticed for some time, the food materials within the refrigerator may spoil. Likewise, an overload of this character may occur during the temporary absence of all of the members of the family, as during vacation periods or on weekends, and the consequent prolonged shutdown of the refrigerator may result in food spoilage. It is, therefore, a further object of my invention to provide a combined automatic and manual control device of the above character which includes means for automatically resetting the control device after an overload operation.

In carrying out my invention in one form, I provide a control device having manual means for opening and closing suitable circuit controlling contacts at will, and temperature responsive means for opening and closing the contacts at predetermined minimum and maximum temperature limits, together with thermal overload means for opening the contacts in response to predetermined current conditions, and means for automatically reclosing the circuit controlling contacts after the thermal element has cooled.

More specifically, I provide a pair of relatively movable circuit controlling contacts, a plurality of independently advanceable and retractable operating members, and operating means for the circuit controlling contacts biased to a circuit closing position and arranged to operate the contacts to open circuit position with a snap action upon advance movement of any one of the operating members. The operating means in accordance with its bias automatically returns the contacts to the closed circuit position with a snap action upon retraction of the operating members, a separate actuating means being provided for advancing and retracting each operating member.

For a more complete understanding of my invention, reference should be had to the drawing, in which Fig. 1 is an elevational side view of a control device embodying my invention; Fig. 2 is a skeleton perspective view of the mechanism shown in Fig. 1; Figs. 3 and 4 are somewhat diagrammatic, elevational views illustrating different operating positions of the control device; and Fig. 5 is a fragmentary, perspective view of a portion of the supporting frame.

Referring now to the drawing, I have shown my invention as embodied in a circuit controlling device comprising a frame 10 which is provided with a yoke portion 11 having a pair of spaced apart legs 12, only one of which is shown, extending outwardly from the lower edges thereof, and a second pair of spaced apart legs 13 and 14 extending outwardly from the upper edges thereof, the leg 13 having an upwardly extending portion 15. Arranged in opposing spaced relation to the yoke portion 11 of the frame 10, I provide a bifurcated supporting member comprising a pair of legs 16 and 17, the lower ends of which are respectively connected by suitable screws 18 to the outermost ends of the legs 12, the upper ends of the legs 16 and 17 being connected by a yoke 19 which is secured by a suitable screw 20 to the portion 15 of the frame 10.

As shown in Fig. 1, a terminal board 21 formed of suitable insulating material is secured to the portion 15 of the frame 10, and carries a pair of terminal screws 22 and 23, the terminal 23 being connected by a conducting strap 24 which supports a fixed contact 25 arranged to be abuttingly engaged by a movable contact 26. Suitable operating means to be fully described hereinafter, are provided for the movable contact 26 and in order to accomplish combined automatic and manual operation, I provide a plurality of independently movable, advanceable and retractable operating members, at least two of which are automatically movable in accordance with predetermined operating conditions of the apparatus to be controlled.

One of the automatically movable operating members comprises an extending finger 27 formed integrally with a movable lever 28 which is pivotally mounted intermediate its ends on a pin 28a supported between the spaced apart legs 12, a portion of the lever 28 on one side of the pivot pin being arranged abuttingly to be engaged by an expansible metallic bellows 29, and the end of the movable lever 28 on the opposite side of the pivot pin being connected to an adjustable spring 30. As will be understood by those skilled in the art, the spring 30 maintains the lever 28 in abutting engagement with the expansible bellows 29, and opposes movement of the lever 28 in accordance with expansion of the bellows, whereby the spring 30 and the bellows 29 cooperate to move the lever 28 about its pivot in accordance with variations in the condition to which the bellows 29 is responsive. In accordance with the usual practice, the bellows 29 is filled with an expansible medium and connected by a tube 31 to a suitable temperature or condition responsive bulb (not shown).

In order to adjust the tension of the spring 30 so as to vary the maximum and minimum conditions at which the lever 28 will be moved about its pivot, I provide a slidably, movable adjusting member or frame 32 to which the opposite end of the spring 30 is connected, as shown best in Fig. 2. This frame 32 is provided, as shown, with a pair of extending ears or lugs 33 which slidably engage suitable slots 34 (see Fig. 5) formed in the spaced legs 16 and 17. Thus the frame 32 is guided for slidable movement by the slots 34, and an inwardly extending finger 35 formed integral with the frame 32 is arranged to be engaged by the periphery of a cam 36 carried on the inner end of a control knob 37 which is journaled for rotation in the yoke member 19.

The second automatically movable operating member comprises thermal overload means including a bimetallic element 38, the lower end of which is supported on an insulating support 39 connected to the lower portions of the spaced apart legs 16 and 17. Supported adjacent the bimetallic element 38 on the insulating member 39, I provide a resistance heater 40 having a pair of terminals 41 and 42. As shown in Fig. 2, the terminal 41 is connected by means of a flexible conductor 43 to a resilient conducting strip 44 which supports the movable contact 26, and the terminal 42 is connected by a suitable conductor 45 to the external terminal 22. Thus the circuit through the control device may be traced from the terminal screw 23 through the conducting strap 24, the contacts 25 and 26, the conductors 44 and 43, the terminal 41, the heater 40, the terminal 42, and by way of the conductor 45 to the terminal screw 22. It will be apparent now that when sufficient heat is generated in the heater 40 due to the flow of a predetermined current through the control device, the bimetallic element 38 will be flexed so as to move the free upper end thereof from the normal position shown in Figs. 1, 2, and 3 to the advanced position shown in Fig. 4. Likewise, upon cooling of the bimetallic element 38 and the heater 40, the upper free end of the bimetallic element will be retracted or returned to the normal position shown in Fig. 1.

The third advanceable and retractable operating member comprises a shaft 46 slidably journaled in the control knob 37, one end of the shaft 46 extending through a slot 47 in the thermal element 38 and the other end of the shaft 46 being provided with a push-button 48. As shown in Fig. 1, the control knob 37 is hollow, and the portion of the shaft 46 within the control knob is provided with a positioning cam 49 having opposing inclined surfaces 50 and 51 which meet in a crest. Arranged to cooperate with one or the other of these inclined surfaces 50 and 51, I provide a circular spring 52 of the type commonly known as the garter spring, which spring is restrained against longitudinal movement by the opposite walls of the control knob 37.

When the slidable shaft 46 is in the extreme right-hand position shown in Fig. 1, it will be apparent that the spring 52, which engages the sloping surface 51 of the cam 49, exerts a force on the shaft 46, tending to retain the shaft in the extreme right-hand position shown. Likewise, it will be apparent that when the shaft is moved in a left-hand direction so that the crest of the cam 49 passes through the garter spring 52, the spring 52 will engage the sloping surface 50 of the cam 49 and will exert a force thereon, tending to maintain the shaft 46 in its extreme left-hand position.

It will now be apparent that each of the elements or members 27, 38, and 46 constitutes an independently movable, advanceable and retractable member, and in order to provide for circuit opening and circuit closing movement of the contact 26 in accordance with advance movement of any one of these operating members, I provide suitable operating means normally biased to a circuit closing position arranged to effect snap movement of the movable contact between open and closed circuit positions upon movement of any one of the operating members.

This operating mechanism is of the type described and claimed in the above referred to Hutt patent, and comprises a control lever 53, one end of which is pivoted on the pin 28a and the other end of which is provided with outwardly extending fingers 54, in which the legs of the U-shaped link 55 are pivotally mounted. The closed end of the link 55 is arranged for movement between a pair of spaced apart stops 56 and 57 which extend outwardly from the leg 14 of the frame 10, and is connected by a spring 58 to a U-shaped contact operating member 59, the legs of which are pivotally mounted in knife-edge bearings 60 respectively formed in the arms 13 and 14 of the frame 10. As shown, this contact operating member 59 supports a channel-shaped insulating member 61 to which is secured the resilient conductor 44 which supports the movable contact 26.

As is more fully described in the above referred to Hutt patent, when the control lever 53 is operated about its pivot so as to move the pivoted end of the link 55 across the line of action of the spring 58, the bias exerted on the link 55 by the spring 58 will be reversed, and accordingly, the closed end of the link 55 will be moved out of engagement with one of the stops 56 and 57 and into engagement with the other one of the stops, thereby reversing the force applied by the spring 58 to the contact operating member 59 and effecting snap movement of the movable contact 26 between open and closed circuit positions.

The control lever 53 is normally biased to the position shown in Fig. 1 by a spring 62, one end of which bears against the control lever and the other end of which bears against a portion of the pivoted lever 28, and in order to operate the control lever 53 from its biased position in accordance with advance movement of any one of the operating members 27, 38, and 46, the operating member 27 is arranged to extend into a slot 63 (Fig. 2) formed in an extending portion 64 of the control lever 53, the slidable shaft 46 is arranged abuttingly to engage a portion of the control lever 53, as shown best in Fig. 2, and the upper end of the control lever 53 is provided with an abutment member 65 formed of insulating material which abuttingly engages the free end of the bimetallic element 38.

It is now believed that a complete understanding of my invention may best be had from a description of the operation. In describing the operation, it will be assumed that the control device is to be applied to the control of an electric refrigerator, in which case the condition responsive bulb (not shown) to which the tube 31 and the expansible bellows 29 are connected, will be arranged so as to be affected by the refrigerator temperature, and the terminals 22 and 23 will be connected by suitable conducting leads (not shown) in the energizing circuit of the refrigerating machine.

With the control device in the operating position shown in Figs. 1 and 2, the energizing circuit for the refrigerator is closed and accordingly the refrigerator temperature to which the expansible bellows 29 is responsive will gradually decrease. As this temperature decreases, the expansible bellows 29 will contract, and accordingly, the lever 28 will be moved in a counter-clockwise direction about its pivot by the spring 30, whereupon the operating member 27 will engage the end of the slot 63 and operate the control lever 53 in a counter-clockwise direction about its pivot against the force of the spring 62. At a predetermined minimum temperature, the magnitude of which depends upon the tension of the spring 30, the upper end of the link 55 will be carried overcenter relative to the line of action of the spring 58, whereupon the contact carrying member 59 will be operated with a snap action to the open circuit position shown in Fig. 3 to interrupt the energizing circuit of the refrigerator. In this position, it will be seen that the spring end of the link 55 engages the stop 57, while the upper end on the contact operating member 59 engages a suitable stop finger 66 which extends downwardly from the portion 15 of the frame 10.

As soon as the circuit controlling contacts 25 and 26 open, the energizing circuit of the refrigerator is interrupted, and accordingly, the temperature of the refrigerator begins to increase, whereupon the bellows 29 is expanded. As the bellows 29 expands, it will be apparent that the lever 28 will be moved in a clockwise direction about its pivot against the force of the spring 30, and accordingly, the operating member 27 will be retracted or moved away from the end of the slot 63. Accordingly, the biasing spring 62 will move the control lever 53 in a clockwise direction about its pivot from the position shown in Fig. 3 to the position shown in Fig. 1, thereby reversing the bias exerted by the spring 58 and effecting snap action of the contact 26 to its closed circuit position.

With the control device in the closed circuit position shown in Fig. 1, it will now be assumed that an overload occurs in the energizing circuit of the refrigerator of such magnitude that the heat generated by the heating element 40 is sufficient to flex the bimetallic element 38 and move the free end thereof from the position shown in Fig. 1 to the position shown in Fig. 4. As the free end of the bimetallic element moves in a left-hand direction, as viewed in the drawing, to the position shown in Fig. 4, it will be apparent that the control lever 53 will be moved in a counter-clockwise direction about its pivot against the bias of the spring 62 and upon a predetermined movement of the control lever 53, the link 55 will be moved overcenter so as to effect snap operation of the contact 26 to the open circuit position shown in Fig. 4.

As soon as the contact 26 moves to this open circuit position shown in Fig. 4, the heater element 40 will be deenergized, and accordingly, the element 40 and the bimetallic element 38 will begin to cool, whereupon the free end of the bimetallic element 38 will be retracted or will return from the position shown in Fig. 4 to the position shown in Fig. 1, and it will be seen that as the free end of the bimetallic element 38 is retracted, the spring 62 will rotate the control lever 53 in a clockwise direction from the position shown in Fig. 4 to the position shown in Fig. 1 and will thereby effect automatic reclosure of the circuit controlling contacts. Under ordinary conditions, the cause of the temporary overload will be cured during the time necessary for the thermal element to cool, and accordingly, it will be seen that normal operation of the refrigerator will be reestablished by my improved control device without the necessity for any manual resetting operation.

If it is desired at any time to manually open the circuit controlling contacts, it is only necessary to depress the push-button 48, whereupon the end of the slidable shaft 46 which abuttingly engages the control lever 53, will effect counter-clockwise rotation of the control element 53 from the position shown in Fig. 1 to an open circuit position corresponding to the positions shown in Figs. 3 and 4. The relative strengths of the garter spring 52 and the biasing spring 62 are so related that the garter spring 52 will maintain the slidable shaft 46 and the control lever 53 in their respective open circuit positions against the bias of the spring 62, and accordingly, reclosure of the circuit controlling contacts may be effected only by manually withdrawing the push-button 48 so as to retract the shaft 46 to the position shown in Fig. 1.

While I have shown a particular embodiment of my invention, it will be understood of course that I do not wish to be limited thereto, since many modifications may be made and I, therefore, contemplate by the appended claims to cover any such modifications as fall within the true spirit and scope of my invention.

What I claim as new and desire to secure by Letters Patent of the United States, is:

1. A circuit controlling device for an electric refrigerator comprising relatively movable contacts, automatic means responsive to the temperature of said refrigerator for respectively opening and closing said contacts at predetermined minimum and maximum temperature limits, overload responsive means for opening said contacts independently of said automatic means in response to predetermined current conditions, and means for automatically reclosing said contacts after overload operation thereof.

2. A circuit controlling device for an electric refrigerator comprising relatively moveable contacts, manual means for opening and closing said contacts at will, means responsive to the temperature of said refrigerator for opening and closing said contacts at predetermined minimum and maximum temperature limits, overload responsive means for opening said contacts in response to predetermined current conditions, and means for automatically reclosing said contacts after overload operation thereof.

3. A circuit controlling device for an electric refrigerator comprising relatively movable contacts, manual means for opening and closing said contacts at will, automatic means for opening and closing said contacts at predetermined minimum and maximum refrigerator temperature limits, thermal overload means for opening said contacts upon the occurrence of predetermined overload conditions, and means for automatically reclosing said contacts upon cooling of said thermal overload means.

4. A circuit controlling device for an electric refrigerator comprising relatively movable contacts, manual means for opening and closing said contacts at will, temperature responsive means for opening and closing said contacts at predetermined minimum and maximum refrigerator temperature limits, a bimetallic element heated in accordance with the current in the circuit for opening said contacts in response to predetermined current conditions, and means for automatically reclosing said contacts upon cooling of said bimetallic element.

5. A circuit controlling device comprising movable circuit controlling means, a plurality of independently advanceable and retractable operating members, and operating means continuously biased to one position for moving said circuit controlling means from one circuit controlling position to another with a snap action in response to advance movement of any of said operating members and for automatically returning said circuit controlling means to said one circuit controlling position with a snap action upon retraction of said operating members.

6. A circuit controlling device comprising movable circuit controlling means, operating means constantly biased to a normal position for moving said circuit controlling means from one circuit controlling position to another with a snap action, a plurality of independently advanceable and retractable operating members each of which is arranged when advanced abuttingly to engage and actuate said operating means from said normal position to move said circuit controlling means to said other position, said operating means in accordance with its bias automatically returning said circuit controlling means to said one position upon retraction of said operating members.

7. A circuit controlling device comprising movable circuit controlling means, a plurality of independently advanceable and retractable operating members, operating means for moving said circuit controlling means from a closed position to an open circuit position with a snap action upon advance movement of any of said operating members and for automatically returning said circuit controlling means to said closed circuit position with a snap action upon retraction of said operating members, one of said advanceable and retractable members comprising overload responsive means automatically advanceable and retractable in accordance with predetermined current conditions whereby said circuit controlling means is operated to said open circuit position upon the occurrence of said predetermined current conditions and is thereafter automatically operated to said closed circuit position.

8. A circuit controlling device for an electric refrigerator comprising movable circuit controlling means, a plurality of independently advanceable and retractable operating members, operating means for moving said circuit controlling means from a closed position to an open circuit position with a snap action upon advance movement of any of said operating members and for automatically returning said circuit controlling means to said closed circuit position with a snap action upon retraction of said operating members, manually operable means for advancing and retracting one of said operating members to open and close the circuit, means responsive to the temperature of said refrigerator for advancing and retracting another of said operating members to open and close the circuit at predetermined minimum and maximum temperature limits, and thermal means heated in accordance with the current in the circuit for advancing and retracting a third one of said operating members to open the circuit upon the occurrence of predetermined current conditions and to reclose said circuit upon cooling of said thermal means.

JOHN EATON.